US012681810B2

(12) United States Patent
Kannery et al.

(10) Patent No.: US 12,681,810 B2
(45) Date of Patent: Jul. 14, 2026

(54) GOLDEN SIGNAL COLLECTION IN A TELEMETRY DATA PROCESSING ARCHITECTURE FOR CLUSTER FILE SYSTEMS

(71) Applicant: Dell Products L.P., Round Rock, TX (US)

(72) Inventors: Supriya Kannery, Bengaluru (IN); Rajat Badola, Bengaluru (IN); Philip Shilane, Newtown, PA (US)

(73) Assignee: Dell Products L.P., Round Rock, TX (US)

( * ) Notice: Subject to any disclaimer, the term of this patent is extended or adjusted under 35 U.S.C. 154(b) by 15 days.

(21) Appl. No.: 18/790,160

(22) Filed: Jul. 31, 2024

(65) Prior Publication Data

US 2026/0037386 A1 Feb. 5, 2026

(51) Int. Cl.
*G06F 11/1446* (2026.01)
*G06F 9/54* (2006.01)
*H04L 43/08* (2022.01)

(52) U.S. Cl.
CPC .......... *G06F 11/1464* (2013.01); *G06F 9/547* (2013.01); *G06F 11/1453* (2013.01); *H04L 43/08* (2013.01); *G06F 2201/805* (2013.01)

(58) Field of Classification Search
CPC .. G06F 11/1464; G06F 9/547; G06F 11/1453; G06F 2201/805; H04L 43/08
See application file for complete search history.

(56) References Cited

U.S. PATENT DOCUMENTS

2021/0342193 A1* 11/2021 Anand ................. G06F 9/5077
2023/0236922 A1* 7/2023 Nagar ................ G06F 11/3419
714/48
2024/0354290 A1* 10/2024 Scott, Jr. .............. G06F 16/213

* cited by examiner

*Primary Examiner* — Tony Wu
(74) *Attorney, Agent, or Firm* — Staniford Tomita LLP

(57) ABSTRACT

A telemetry processing system in a Kubernetes-based cluster network receives golden signal telemetry data from a plurality of pods and formats it into a structured format for validation and storage in a datastore. The golden signals include are generated during data protection operations and are used to reveal problems encountered by the pods. A latency golden signal measures a time between operation request and initiation, the traffic golden signal measures an amount of activity present in an initiated operation, the errors golden signal measures a rate at which requests to the backup server are failing, and the saturation golden signal measures system utilization in terms of how much excess capacity the initiated operation has available.

20 Claims, 11 Drawing Sheets

100

150

500

| CONSUMER | SAMPLE TELEMETRY DATA CONSUMED | PURPOSE |
|----------|-------------------------------|---------|
| Storage Users | Alerts, Summary, Security State | Generate daily alert summary to cover any missed asynch alert |
| GUI | Performance, Topology | GUI displays topology and performance details in real time |
| Internal Pods | Feature details | Internal services consume system performance info to adjust resources |
| Storage Vendor | License, capacity information | Storage vendor enforces business terms |

FIG. 5

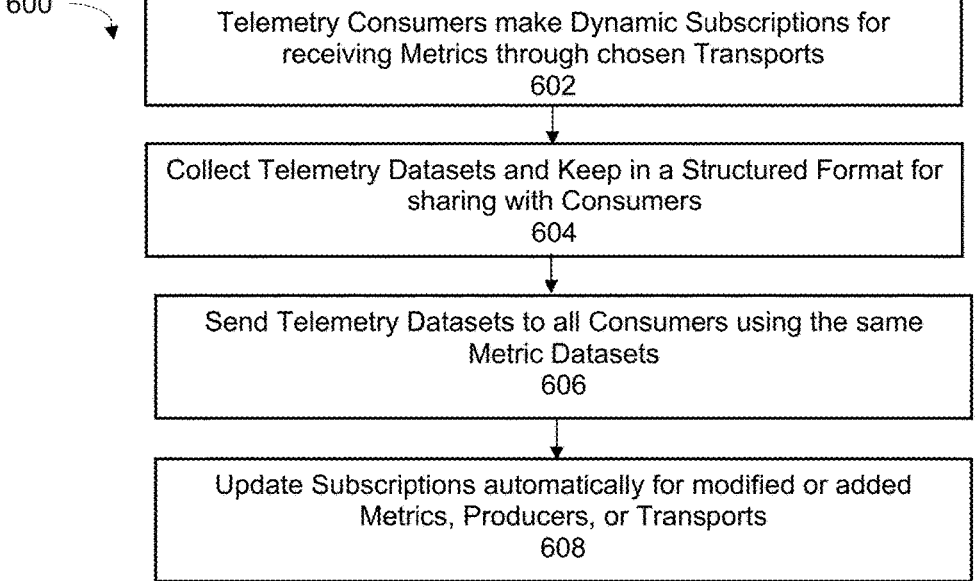

600

Telemetry Consumers make Dynamic Subscriptions for receiving Metrics through chosen Transports
602

Collect Telemetry Datasets and Keep in a Structured Format for sharing with Consumers
604

Send Telemetry Datasets to all Consumers using the same Metric Datasets
606

Update Subscriptions automatically for modified or added Metrics, Producers, or Transports
608

FIG. 6

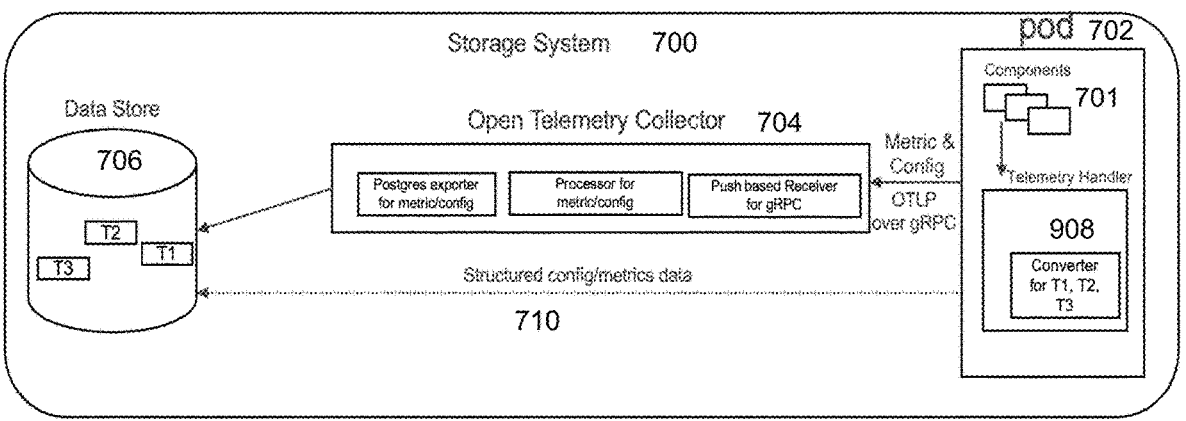

Storage System    700

Data Store

706

T2
T3    T1

Open Telemetry Collector    704

Postgres exporter for metric/config | Processor for metric/config | Push based Receiver for gRPC Metric & Config OTLP over gRPC pod 702

Components    701

Telemetry Handler

908

Converter for T1, T2, T3

Structured config/metrics data

| SIGNAL | PURPOSE |
|---|---|
| Latency | The time that passes between a service request and reception |
| Traffic | Measures how much application is present in an application |
| Errors | The rate at which requests are failing |
| Saturation | High-level overview of system utilization |

| Registering Pod | Latency Probe | API Endpoint(s) | Threshold |
|---|---|---|---|
| Telemetry Transmitter | .../telemetrytransmitter/ goldensignals/latency | .../Metrics GET | 5 mins |
| Timescale Pod | .../timescale/goldensignals/ latency | .../data GET | 3 mins |

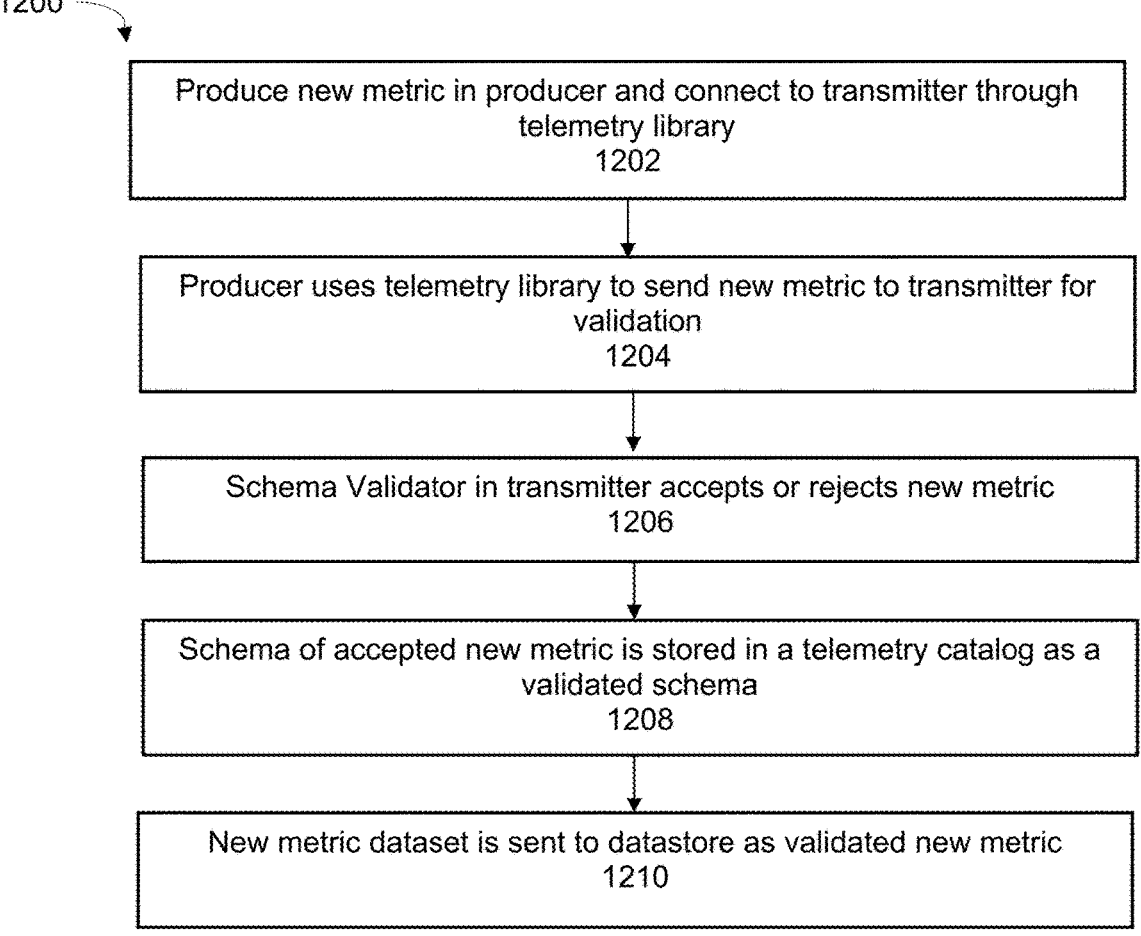

Produce new metric in producer and connect to transmitter through telemetry library
1202

Producer uses telemetry library to send new metric to transmitter for validation
1204

Schema Validator in transmitter accepts or rejects new metric
1206

Schema of accepted new metric is stored in a telemetry catalog as a validated schema
1208

New metric dataset is sent to datastore as validated new metric
1210

FIG. 12

GOLDEN SIGNAL COLLECTION IN A TELEMETRY DATA PROCESSING ARCHITECTURE FOR CLUSTER FILE SYSTEMS

TECHNICAL FIELD

Embodiments are directed to distributed networks, and more specifically to providing comprehensive telemetry data management with golden signal collection.

BACKGROUND

A distributed (or cluster) network runs a filesystem in which data is spread across multiple storage devices as may be provided in a cluster of nodes. Cluster networks (or cluster systems) represent a scale-out solution to single node systems by providing networked computers that work together so that they essentially form a single system. Each computer forms a node in the system and runs its own instance of an operating system. The cluster itself has each node set to perform the same task that is controlled and scheduled by software. In this type of network, the file system is shared by being simultaneously mounted on multiple servers. This type of distributed filesystem can present a global namespace to clients (nodes) in a cluster accessing the data so that files appear to be in the same central location. They are typically very large and may contain many hundreds of thousands or even many millions of files, as well as services (applications) that use and produce data.

The Santorini filesystem represents a type of cluster system that stores the file system metadata on a distributed key value store and the file data on object store. The file/namespace metadata can be accessed by any front end node, and any file can be opened for read/write operations by any front-end node.

Because of their extensive scale and complex component features, cluster systems are typically provided by vendors and installed for use by customers (users). Proper system administration requires the collection and transmission of relevant data to users from applications, nodes, and product vendors within the system. Such data is referred to as "telemetry" data and includes information about the running system that is generated periodically and that should be stored and transferred to the various clients as needed.

Present telemetry architectures are typically fixed with respect to the type and amount of data that is available for users and clients. As distributed systems evolve and become more complex, it is increasingly important to provide flexible telemetry mechanisms for storage systems. Present systems are not flexible and dynamic enough to collect and processed so-called 'golden signals', i.e., those related to traffic, latency, errors, and saturation.

What is needed, therefore, is a telemetry architecture for distributed systems that facilitates the dynamic processing of telemetry data including golden signals.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. Dell and EMC are trademarks of Dell Technologies, Inc.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

FIG. 5 is a table that lists some example consumers and datasets a telemetry system, under some embodiments.

FIG. 6 is a flowchart that illustrates a process of implementing a subscription-based telemetry architecture for Kubernetes-based scale-out products, under some embodiments.

FIG. 7 illustrates a telemetry data pipeline, under some embodiments.

FIG. 8 is a table that some golden signals a telemetry system, under some embodiments.

FIG. 11 illustrates an example of registering a latency probe for a latency golden signal, under an example embodiment.

FIG. 12 is a flowchart that illustrates a method of dynamically registering new telemetry datasets including golden signals and probes, under some embodiments.

DETAILED DESCRIPTION

Figure 1:
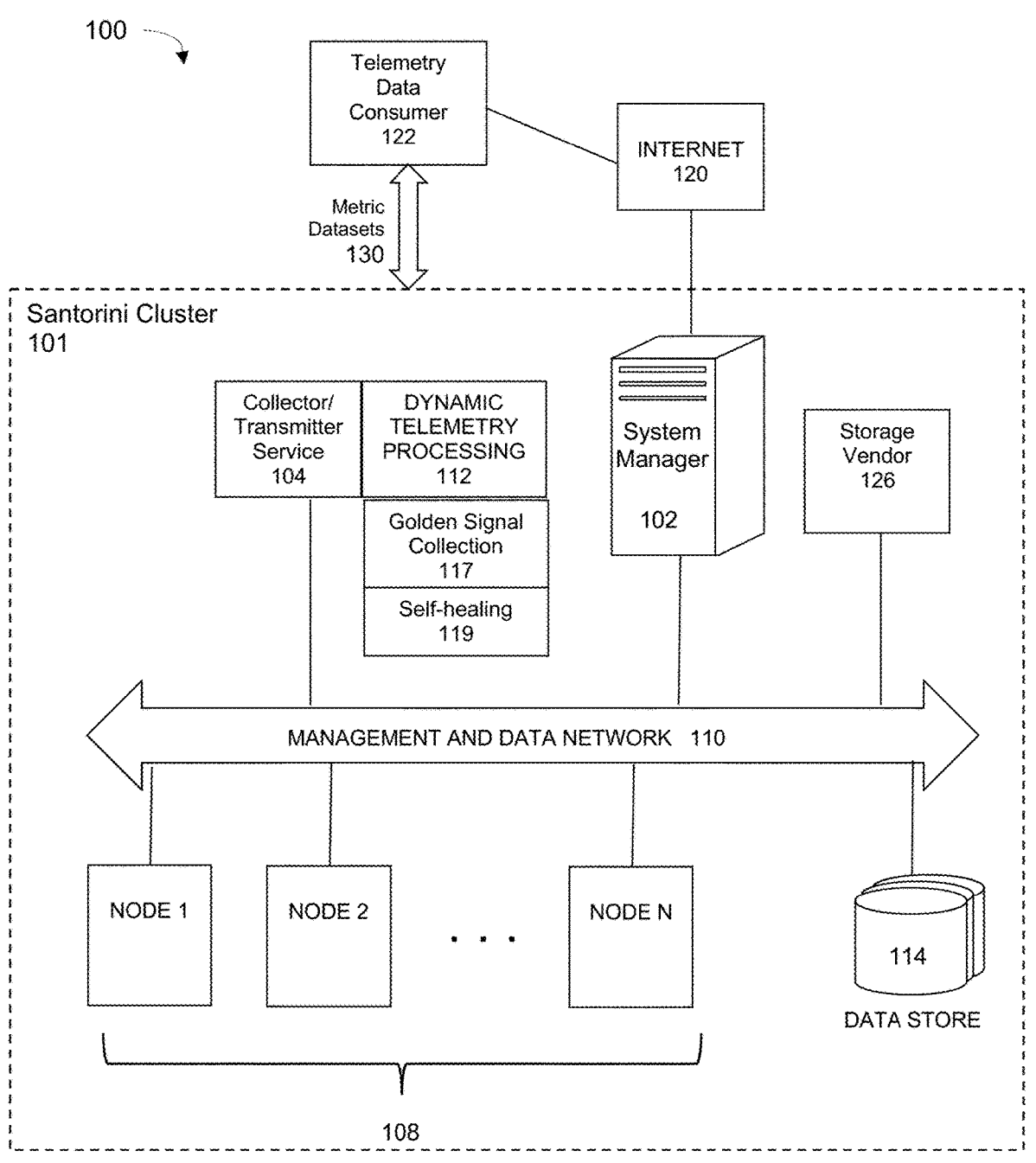
FIG. 1 is a block diagram illustrating a distributed system implementing flexible telemetry processing for cluster networks, under some embodiments.

A detailed description of one or more embodiments is provided below along with accompanying figures that illustrate the principles of the described embodiments. While aspects of the invention are described in conjunction with such embodiments, it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information.

Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the invention. In this specification, these implementations, or any other form that the invention may take, may be referred to as techniques. In general, the order of the steps of disclosed processes may be altered within the scope of the described embodiments.

Embodiments are directed to a processing components for features implementing telemetry data process for cluster network filesystems (e.g., Santorini) for providing users with a flexible system environment where they can dynamically subscribe for different telemetry metrics through preferred transports.

FIG. 1 is a block diagram illustrating a distributed system implementing flexible telemetry processing for cluster networks, under some embodiments. System 100 comprises a large-scale network that includes a cluster network 101 having a number of different devices, such as server or client computers 102, nodes 108, storage devices 114, and other similar devices or computing resources. Other networks may be included in system 100 including local area network (LAN) or cloud networks, and virtual machine (VM) storage or VM clusters. These devices and network resources may be connected to a central network, such as a data and management network 110 that itself may contain a number of different computing resources (e.g., computers, interface devices, and so on). FIG. 1 is intended to be an example of a representative system implementing a distributed computing system under some embodiments, and many other topographies and combinations of network elements are also possible.

A distributed system 101 (also referred to as a cluster or clustered system) typically consists of various components (and processes) that run in different computer systems (also called nodes) that are connected to each other. These components communicate with each other over the network via messages and based on the message content, they perform certain acts like reading data from the disk into memory, writing data stored in memory to the disk, perform some computation (CPU), sending another network message to the same or a different set of components and so on. These acts, also called component actions, when executed in time order (by the associated component) in a distributed system would constitute a distributed operation.

A distributed system may comprise any practical number of compute nodes 108. For system 100, n nodes 108 denoted Node 1 to Node N are coupled to each other and a connection manager 102 through network 110. The connection manager can control automatic failover for high-availability clusters, monitor client connections and direct requests to appropriate servers, act as a proxy, prioritize connections, and other similar tasks.

In an embodiment, cluster network 101 may be implemented as a Santorini cluster that supports applications such as a data backup management application that coordinates or manages the backup of data from one or more data sources, such as other servers/clients to storage devices, such as network storage 114 and/or virtual storage devices, or other data centers. The data generated or sourced by system 100 may be stored in any number of persistent storage locations and devices, such as local client or server storage. The storage devices represent protection storage devices that serve to protect the system data through applications 104, such as a backup process that facilitates the backup of this data to the storage devices of the network, such as network storage 114, which may at least be partially implemented through storage device arrays, such as RAID (redundant array of independent disks) components. The data backup system may comprise a Data Domain system, in which case the Santorini network 101 supports various related filesystem and data managers, such as PPDM, as well as services such as ObjectScale and other services.

In an embodiment network 100 may be implemented to provide support for various storage architectures such as storage area network (SAN), Network-attached Storage (NAS), or Direct-attached Storage (DAS) that make use of large-scale network accessible storage devices 114, such as large capacity disk (optical or magnetic) arrays for use by a backup server, such as a server that may be running Networker or Avamar data protection software backing up to Data Domain protection storage, such as provided by Dell Technologies, Inc.

Cluster network 101 includes a network 110 and also provides connectivity to other systems and components, such Internet 120 connectivity. The networks may be implemented using protocols such as Transmission Control Protocol (TCP) and/or Internet Protocol (IP), well known in the relevant arts. In a cloud computing environment, the applications, servers and data are maintained and provided through a centralized cloud computing platform.

As shown in FIG. 1, network 101 includes a collector service 104 and dynamic telemetry processing component 112 that is executed by the system to manage the telemetry architecture for users/customers of the system. Process 112 may be a process executed by a specialized node as a specially configured management or control node in system 100. Alternatively, it may be executed as a server process, such as by server 102 or any other server or client computer in the system. The telemetry management process 112 works with the other components of the distributed system and may use certain services or agents that run on each compute node 108 in the distributed system, such as may be implemented as a daemon process running in each node. As generally understood, a daemon is a computer program that runs as a background process, rather than being under the direct control of an interactive user.

As shown in FIG. 1, overall system 100 includes a storage system operated by a storage vendor 126 for protection of data of applications, operating systems, or resources of the cluster network 101. Such a vendor may be called upon to resolve issues or provide fixes to problems encountered by users of these products. In an embodiment, telemetry information 130 is transmitted between the vendor and telemetry data consumers 122, such as over the Internet 120 or over a local network link. In general, the telemetry can be sent to many destinations for use or "consumption" by many different types of consumers. One consumer might be a product customers or system users for their own management purposes. Another consumer might be internal processes that analyze telemetry and sometimes respond to adjust the system or send alerts to the vendor. The vendor itself may also be a consumer. Different types of telemetry can have different destinations, and some telemetry can go to multiple destinations.

Some consumers (e.g., vendors, system admins, etc.) may perform analysis, debugging, or modifications in the form of bug fixes, patches, revisions, etc., that the user can then install or execute in the cluster. In an embodiment, certain debugging tools may be provided in a node to help the vendor analyze and process the telemetry data. In general, the term "consumer" refers to any entity that receives the telemetry data for some use, and may include a user, subscriber, customer, and so on, of system data and resources. The telemetry data may be made available as part of any service, such as on a complementary basis or for a fee by a service provider by contract or subscription.

Figure 2:
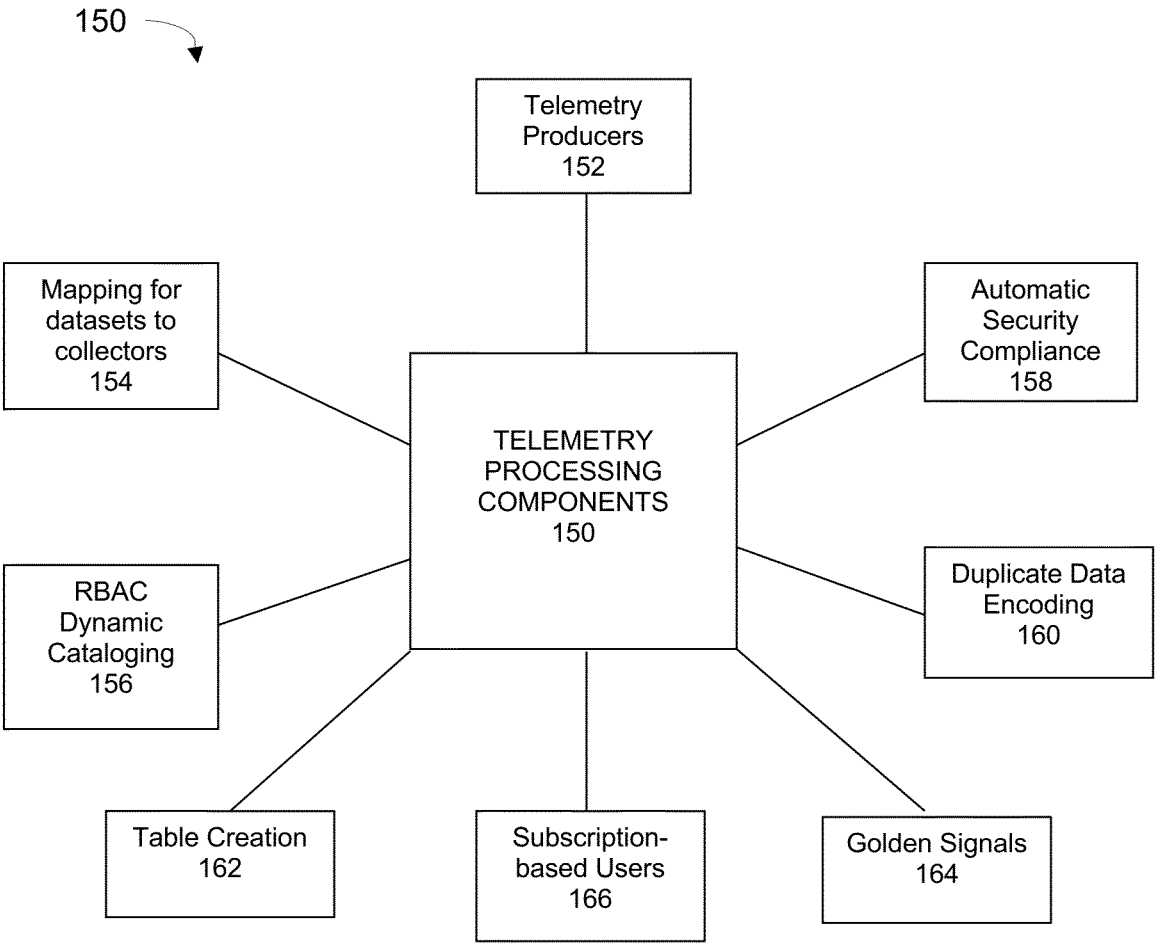
FIG. 2 is a diagram illustrating telemetry processing features for the system of FIG. 1, under some embodiments.

FIG. 2 is a diagram illustrating example telemetry service features for the system of FIG. 1. As shown in FIG. 2, the Santorini cluster 101 of FIG. 1 contains several different components 150 to provide telemetry services to the cluster as it performs its tasks of supporting applications in the system. The components of FIG. 2 allow services and producers to push telemetry to a centralized data store. Telemetry collectors push consistent metrics to "subscribers," which can be varied entities, such as graphical user interfaces (GUI), nodes (pods), or other processes internal or external to a product.

In system 150, telemetry producers 152 dynamically register to add new telemetry metrics. A subscription-based model is used to allow dynamic registrations from subscribers/users 166. The producers may be allowed access through role-based access control (RBAC) protocols. In an embodiment, system 150 may implement an open telemetry system (OTEL) that is opaque regarding transport of data to the subscribers.

The system allows dynamic frequency requests through a method to map data sets to collectors to optimize data collection and sharing, 154. It also provides RBAC-based dynamic cataloging and RBAC-based telemetry collection 156. Currently, catalogs do not show user based entries, and internal and external processes are not allowed to subscribe for different datasets. Process 156 remedies this shortcoming.

System 150 also includes automatic security compliance checks 158 for metric data during data collection, 158. Such compliance checks can be tunable with defined parameters and rules.

Optimization features can include encoding duplicate data values to optimize network bandwidth, 160, and other similar optimizations. For example, system 150 further includes a process for telemetry table creation and merging in time series for optimal data storage, 162. For sustainability, the system may enforce golden signals data collection, 164.

Details of these functional components are provided in greater detail below. The functions illustrated in FIG. 2 are just some examples of possible functions, and embodiments are not so limited. Additional or different functions may also be used.

In an embodiment, cluster network 101 providing the features of system 150 implements containerization technology through a Kubernetes implementation. A container is a virtualized computing environment to run an application program as a service or microservice, and are lightweight, portable data constructs that are decoupled from the underlying infrastructure. Applications are run by containers as microservices with the container orchestration service facilitating scaling and failover. For example, the container orchestration service can restart containers that fail, replace containers, kill containers that fail to respond to health checks, and will withhold advertising them to clients until they are ready to serve.

In an embodiment, system 100 uses Kubernetes as an orchestration framework for clustering the nodes 1 to N in FIG. 1. Application containerization is an operating system level virtualization method for deploying and running distributed applications without launching an entire VM for each application. Instead, multiple isolated systems are run on a single control host and access a single kernel. The application containers hold the components such as files, environment variables and libraries necessary to run the desired software to place less strain on the overall resources available. Containerization technology involves encapsulating an application in a container with its own operating environment, and the well-established Docker program deploys containers as portable, self-sufficient structures that can run on everything from physical computers to VMs, bare-metal servers, cloud clusters, and so on. The Kubernetes system manages containerized applications in a clustered environment to help manage related, distributed components across varied infrastructures. Certain applications, such as multi-sharded databases running in a Kubernetes cluster, spread data over many volumes that are accessed by multiple cluster nodes in parallel.

In Kubernetes, a pod is the smallest deployable data unit that can be created and managed. A pod is a group of one or more containers, with shared storage and resource requirements. Pods are generally ephemeral entities, and when created, are scheduled to run on a node in the cluster. The pod remains on that node until the pod finishes execution.

In an embodiment, the dynamic telemetry process 112 is used in a clustered network that implements Kubernetes clusters. One such example network is the Santorini system or architecture, though other similar systems are also possible.

Such a system can be used to implement a Data Domain (deduplication backup) process that uses object storage (e.g., Dell ObjectScale), Kubernetes, and different types of storage media, such as HDD, Flash memory, SSD memory, and so on. In an embodiment, a PPDM (PowerProtect Data Manager) microservices layer builds on the Data Domain system to provide data protection capabilities for VM image backups and Kubernetes workloads. Santorini exposes a global namespace that is a union of all namespaces in all domains.

Figure 3:
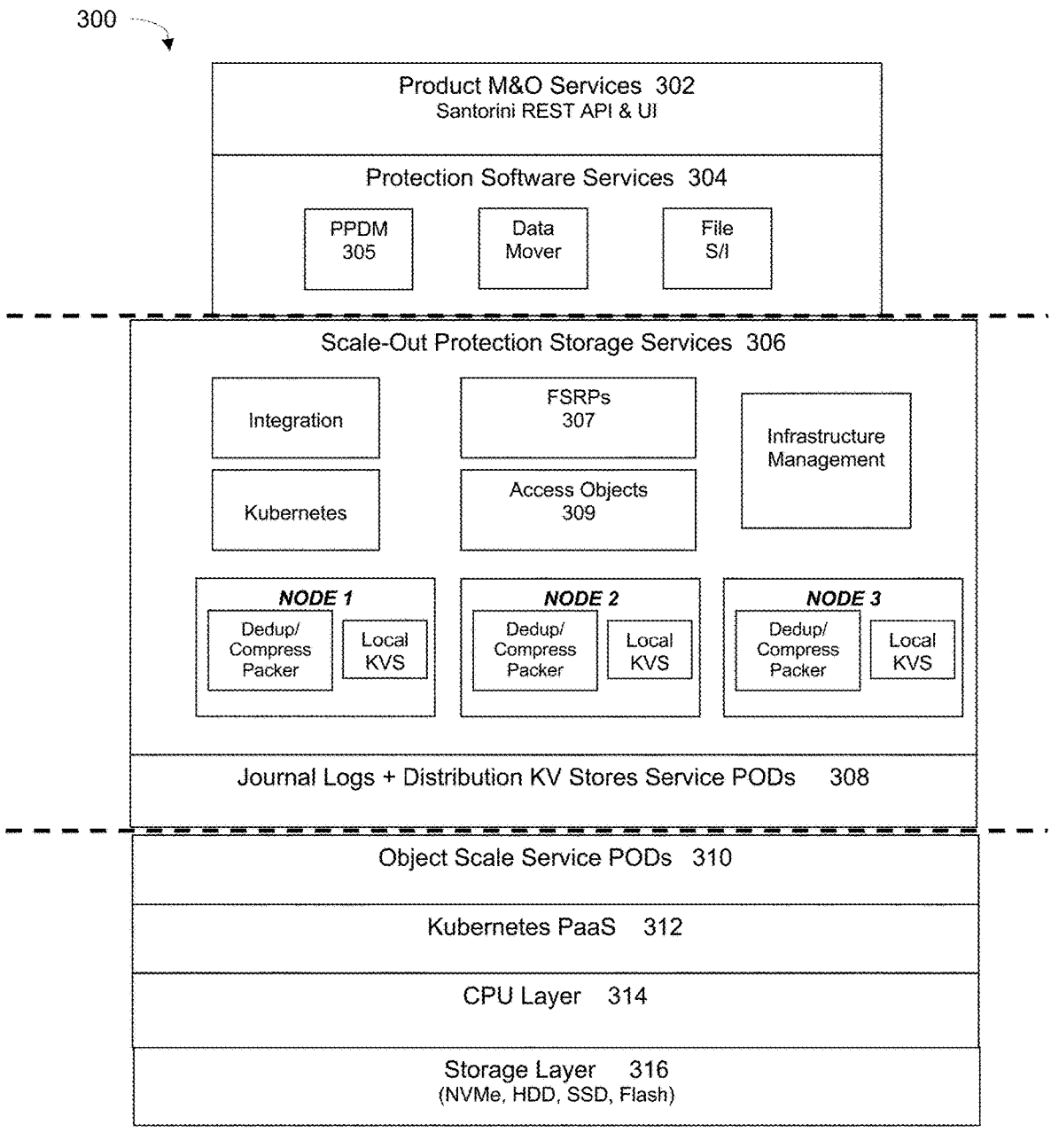
FIG. 3 illustrates an example of some services related to the data path running in Santorini cluster network, under some embodiments.

FIG. 3 illustrates an example of some services related to the data path running in Santorini cluster network, under some embodiments. As shown in diagram 300, a product services layer 302 provides the necessary REST APIs and user interface utilities. The API server implements a RESTful interface, allowing many different tools and libraries can readily communicate with it. A client called kubecfg is packaged along with the server-side tools and can be used from a local computer to interact with the Kubernetes cluster.

Below layer 302, the protection software services layer 304 includes a data manager (e.g., Power Protect Data Manager, PPDM) component 305 that provides backup software functionality. Within the scale-out protection storage services layer 306, the File System Redirection Proxy (FSRP) service 307 redirects file operations in a consistent manner based on the hash of a file handle, path, or other properties to instance of the access object service 309. The access object service 309 handles protocols and a content store manager. This means that files are segmented and the Lp tree is constructed by an access object 309. The FSRP 307 redirects file system accesses in a consistent way to the access objects 309 so that any in-memory state can be reused if a file is accessed repeatedly in a short time, and it avoids taking global locks.

Also included in this layer 306 are any number of nodes (e.g., Nodes 1 to 3, as shown), each containing a dedup/compression packer and a key-value (KV) store.

Distributed key value (KV) stores are also a component of Santorini and are used to hold much of the metadata such as the namespace Btree, the Lp tree, fingerprint index, and container fingerprints. These run as containers within the Santorini cluster and are stored to low latency media such as NVMe. There is also a distributed and durable log that replaces NVRAM for Santorini.

Subscription-Based Telemetry Data Processing

Capturing data is critical to helping understand how applications and infrastructure perform at any given time. This information is gathered from remote, often inaccessible points within a system, and the data can be voluminous and difficult to store over long periods because of capacity limitations. As telemetry becomes more important for distributed software products, the need increases for flexible telemetry architecture defined for storage systems, as current systems are simply not dynamic enough to add new metric data sets, data producers or consumers in storage systems during runtime.

Telemetry data is typically made up of logs, metrics, and traces. Logs provide an event-based record of notable activities across the system and can be formatted as structured, unstructured, or plain text that give the results of any transaction involving an endpoint in the system, but that may require log analysis tools for user review. Metrics are numerical data points represented as counts or measures often calculated or aggregated over time. Metrics originate from several sources including infrastructure, hosts, and third-party sources. Most metrics are accessible through query tools. Traces are generated by following a process from start to finish (e.g., an API request or other system activity).

It should be noted that telemetry data may capture activities that comprise normal system operation or anomalies or fault conditions. Most telemetry data generated in a normal running system typically comprises routine system data. Telemetry data can also include or flag problems or issues in the system. Alerts are one type of telemetry indicating a problematic situation has occurred. In some cases, the system may be able to automatically recover from this condition. Other times, an alert means that support needs to be engaged to address the situation.

In an embodiment, the telemetry data of interest generally comprises metrics that may be provided in alphanumeric form and comprises information about a running system. Telemetry data is data that is generated periodically through normal system operation and that should be stored and transferred to users/clients when needed or requested. Such data may include characteristics such as space usage, latency for function calls or APIs, user-initiated operations, internal process status, network traffic, component temperatures, and so on. The telemetry data may be generated through generic system processes or Santorini-specific processes, such as backup/restore operations, deduplication processes, replication functions, configuration updates, Garbage Collection (GC) processes, and so on.

Telemetry data may be ultimately provided to an end user or administrator for system analysis, debugging, or other desired purposes. The telemetry data may be generated by the pods as raw data which is then transformed into formatted records for storage in a backend database. This data may then be input to a front-end database for use by the user.

In present systems, the telemetry data is based strictly on a static data definition. This results in fixed and non-flexible processing of such data. Embodiments provide a system that overcomes this shortcoming by providing dynamic processing of telemetry data, thus providing much greater flexibility in allowing new datasets, producers, and consumers to be dynamically defined and modified in running systems.

Figure 4:
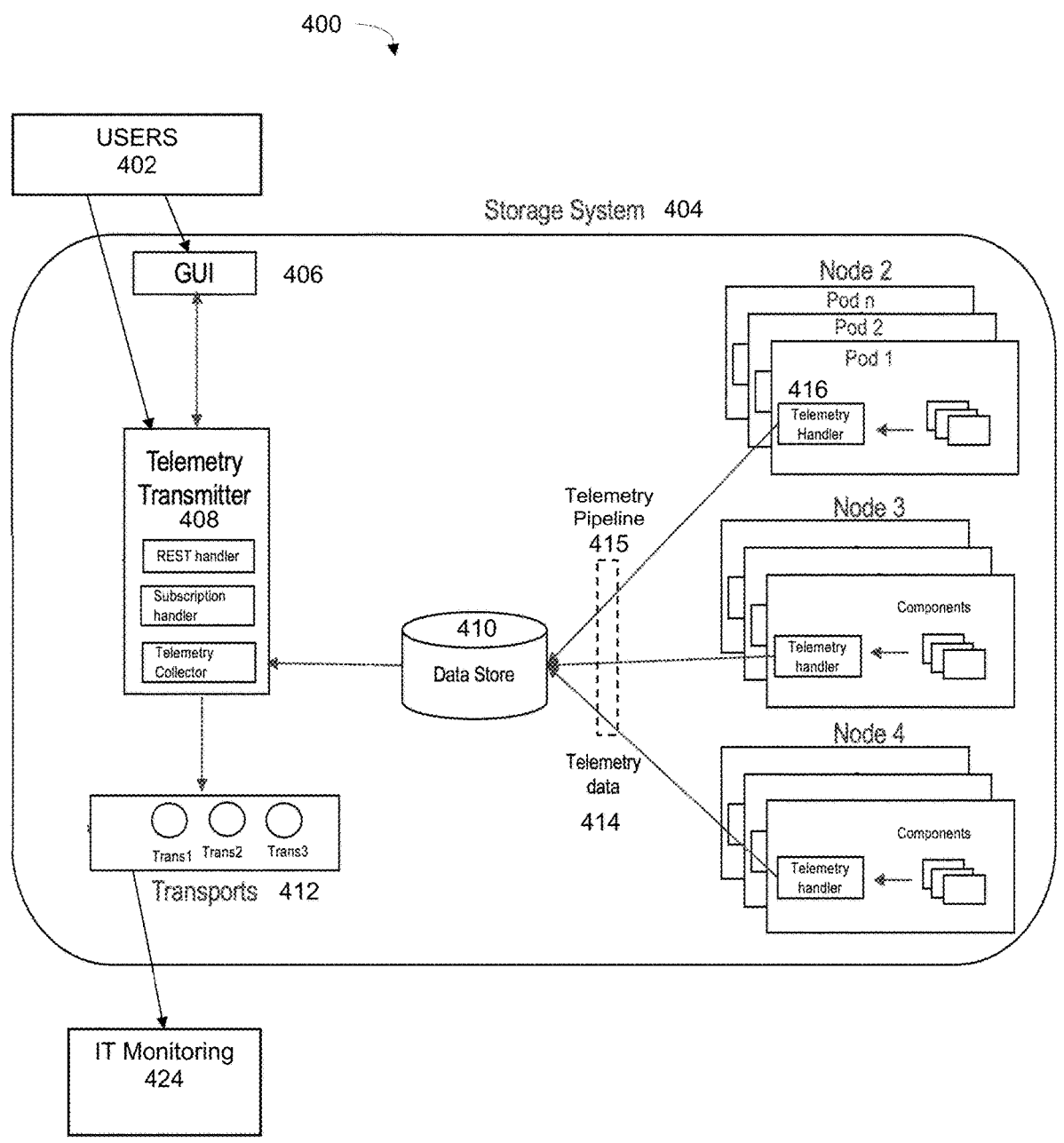
FIG. 4 illustrates an advanced telemetry architecture for a Kubernetes-based storage system processing telemetry datasets, under some embodiments.

FIG. 4 illustrates an advanced telemetry architecture for Kubernetes-based storage systems, under some embodiments. As shown in FIG. 4, system 400 includes a containerized storage system 404 comprising a number of nodes (e.g., denoted Node 2, Node 3, Node 4, and so on), each having a number of pods (e.g., Pod 1 to n). Each pod has a telemetry handler component 416 that sends telemetry data 414 in the form of metrics to a data store 410.

In system 400, telemetry consumers are allowed to make dynamic subscriptions for receiving different metric datasets 414 through one or more different transport mechanisms 412 (e.g., Webhook, SMTP, SNMP, etc.) for which they have subscribed. Consumers can be GUIs 406, internal pods, storage vendor IT backend systems 424, or storage system users. Raw data from the pods is collected through their respective telemetry handlers 416 and stored in a central data store 410. In an embodiment, this can be done using Open Telemetry (OTEL) for a standard way of data collection. A telemetry transmitter 408 will then read data from data store, perform any required processing and then send the telemetry data to the subscribers through the subscribed transports 412. FIG. 4 shows some example subscribers as an IT monitoring component 424 and GUI 406 for use by user 402, but other consumers are also possible.

For a containerized storage system 400, such as shown in FIG. 4, the telemetry processing system is pod-based rather than node-based to provide a high level of granularity with respect to telemetry data production and consumption.

As mentioned above, system 400 may utilize an OTEL framework, where OTEL is generally understood to be an open source observability platform comprising a collection of tools, APIs and SDKs. OTEL enables users to instrument, generate, collect, and export telemetry data for further analysis. OTEL can provide a standard format dictating how data is collected and sent through unified sets of vendor-agnostic libraries and APIs. It removes the need to operate and maintain multiple agents/collectors.

In an embodiment, system 400 may collect telemetry data by having each service send the data directly to a backend process. Alternatively, system 400 may utilize a collector process implemented alongside each service. This allows a service to offload data quickly. Such a collector can also take care of additional processing, such as retries, batching, encryption, filtering, and so on.

FIG. 5 is a table that lists some example consumers and datasets a telemetry system, under some embodiments. For purposes of the present description, the term "consumer" generally means an entity, process, or component that uses telemetry data, such as listed in table 400, a "subscriber" is a consumer that has subscribed to use of telemetry data through a transport mechanism, and a "user" is an entity, such as a person, who accesses the telemetry data through a consumer, such as a GUI or other appropriate mechanism.

As shown in table 500, consumers may include storage users, GUIs, internal pods, and storage vendors, among other possible consumers. Various different telemetry data sets may be consumed by each consumer out of all of the telemetry data produced by the pods. For example, storage users may consume alerts, summary data, and security states of the pods for the purpose of generating periodic (e.g., daily or hourly) alert summaries to cover any asynchronous alerts that may have been generated but missed by any of the relevant components in the system. A GUI consumer may consume performance and topology telemetry data to display the relevant topology and performance details in real-time to any interested storage users. Internal pods may consume feature detail information to determined system performance for the purpose of adjusting resources (load balancing) and similar purposes. The storage vendor may consume license, capacity, and usage information to enforce system subscription and business/contract terms to make sure all users maintain fair usage of the storage system. FIG. 5 is provided primarily for purposes of illustration, and many other consumers, consumed data, and purposes are also possible.

As mentioned above, consumers are allowed to make dynamic subscriptions for receiving different metric datasets 414 through one or more different transport mechanisms for which they have subscribed. FIG. 6 is a flowchart that illustrates a process of implementing a subscription-based telemetry architecture for Kubernetes-based scale-out products, under some embodiments. As shown in FIG. 6, process 600 begins by allowing telemetry consumers to make dynamic subscriptions for receiving metrics, 602. Subscribers can choose metric data sets and transports to receive those data sets. For example any consumer can customize notifications of data and the applicable datasets per system, as they can subscribe according to the system location or security setup, and so on.

The subscription process utilizes a plurality of database tables to store subscription states and values formatted according to defined schema. Tables can be defined for storing consumer details, metrics that they subscribe to, and the transports to be used, and additional tables may be used for storing details of available transports. FIG. 7A illustrates an example user subscription table, under some embodiments. As shown for the example of FIG. 7A, two example users, "User-1" and "User-2" are listed. User-1 may subscribe to metric data through the Webhook transport, which has ID "Webhook_target_ID," while User-2 may subscribe to alert data through the SMTP transport, which has ID "SMTP_target_ID. The entries of FIG. 7A are provided for purposes of example only, and any number of users and notification filters, transport mechanisms, and transport IDs may be used depending on system configuration.

A simplified subscription table may list metrics per user per transport as shown in example table 1 as follows:

TABLE 1

| M1 | U1 | T1 |
|----|----|----|
| M2 | U2 | T2 |
| M2 | U3 | T1 |

In Table 1 above, Mx refers to a specific metric datasets out of all the available telemetry data, Uy references a particular user, and Tz references the selected transport mechanism. Thus, in the example of Table 1, metric M1 is sent to user 1 over transport 1, metric 2 is sent to user 2 over transport 2, and metric M2 is sent to user 3 over transport 1.

For every type of transport, REST APIs are provided to consumers for subscription. For example, using the REST API for webhook subscription, a consumer can provide details of the webhook REST endpoint to be used for sharing metrics. The consumer can also mention which of the metrics from catalog need to be notified through the specified webhook REST endpoint. These details are stored in the consumer subscription table and other tables related to transports. Whenever scheduled telemetry jobs run and collect metrics, the consumer subscription table is checked. If there is a subscription for the collected metrics through a specific transport, the job will share the mentioned metrics through the specified transport.

Although embodiments are described with respect to using REST APIs, it should be noted that embodiments are not so limited. Other similar mechanisms that facilitate consumer access and subscription to the metrics are also possible. Likewise, the subscription table can be implemented through a system database or any similar centrally stored and accessible data element.

Telemetry datasets are collected and kept in a structured format for sharing with consumers, 604. The consumers can span various entities, such as GUI/pods across cluster nodes, storage system users, vendor IT backend, and so on. All such consumers get the same metric datasets from the central data store to ensure data consistency, 606. At any point in time, therefore, the data received for a specific metric by all subscribers will be the same.

If any aspect of the network changes with respect to the production of telemetry data, the consumer subscriptions are all updated automatically, such as if any metric, producer, transport, and so on, is modified or added, 608. This update occurs within a defined period of time after the change occurs, and is implemented through an update to the relevant consumer databases. In an embodiment, when a producer registers a new metric using the registration REST API, this new metric is validated for schema and then added to the catalog dynamically. An info alert will be generated in the system so that prospective consumers are informed that a new metric is available for subscription. If any subscriber or system admin updates details of the transport enabled in the system, the transport details are automatically updated in respective database tables through a REST API workflow.

The raw data from a pod can be provided in any appropriate format depending on the type of pod/service and data type. For example, if a pod provides disk capacity data, such data can be formatted as follows:

```
master1:-/new_metricstest/data # cat data_domain_disk_capacity.json
{
    "serial number": "AUDVRN72S7DJCP",
    "disk": "dev4",
    "slot": "160:3",
    "model": "VMware Virtual_disk",
    "firmware": "n/a",
    "type": "SAS-SSD",
    "partNumber": "n/a",
    "serialNo": "6000c293a7d6......",
    "capacity": 536870912000
}
```

The above example shows programming code for an example virtual disk used in a Data Domain system. This data can converted to a structured format for storage in one or more tables in the data store. It should be noted that the above shown programming code is provided for purposes of illustration only, and any data structure, programming language, definitions, values, and so on, may be used.

As shown in FIG. 4, the raw telemetry data 414 from the pods is sent through a pod resident telemetry handler 416 to the data store 410. In an embodiment, the raw telemetry data 414 is sent to the data store through a telemetry pipeline 415. FIG. 7 illustrates a telemetry data pipeline, under some embodiments. In FIG. 7, storage system 700 comprises a pod 702 coupled to data store 706 through an open telemetry collector 704. The pod 702 contains certain components 701, such as disks, devices, and so on. These components all periodically generate telemetry data that is input to telemetry handler 708. The telemetry handler includes a converter to convert the telemetry datasets for the components, such as denoted T1, T2, T3, for the example of FIG. 7. The metric telemetry data is input from the pod 702 to the collector 704 over appropriate interfaces, such as OTLP (Open Telemetry protocol) gRPC (remote procedure call) interfaces, and the like. The collector includes a push-based receiver, a processor, and an exporter for the metric data. The datasets (T1, T2, T3) are then stored in data store 706. In an embodiment, the metric data can also be converted to structured data in the pod's telemetry handler 708 and sent for storage in data store 706 directly as the structured data 710.

Datasets are exposed to users through a variety of different interfaces (e.g., REST/CLI/GUI or notifications), and will be consistent at any time point as they are sent from the same data pool and pre-defined frequency.

Product vendors, through their backend components can subscribe for new datasets from systems in the field dynamically. Datasets shared with vendor backends are structured, and OTEL-based data enables community tools to be leveraged for data analytics.

Golden Signal Telemetry Data Processing

Certain signals are very important for monitoring and tuning a storage system based on Kubernetes containerization technology. These signals are referred to as 'golden signals,' and some examples are shown in FIG. 8. As shown in table 800 of FIG. 8, the golden signals comprise (1) latency, which measures the time between the moment a service is requested and the moment it is received, (2) traffic, which measures how much activity is present in an application, (3) errors, which is the rate at which requests are failing, and (4) saturation, which is an overview of system utilization, such as indicating how much more capacity a service has, or when is the service maxed out. FIG. 8 illustrates some example golden signals, and other or additional signals may also be used depending on system configuration.

Embodiments of system 100 include a golden signal collection process 117 that works with the dynamic telemetry process 112. This process facilitates the automatic collection of golden signals in the system through a library that is added to every pod (such as through a REST handler) and which will track and share the latency, errors, traffic and saturation for every pod. Other mechanisms can also be used, such for pods having a sidecar proxy, where the library can be hooked to the telemetry APIs to collect the data and send it to the telemetry infrastructure. These mechanisms, such as the sidecar, inject a golden signals container into pods that do not have that functionality, so that golden signals are always sent as telemetry data.

Figure 9:
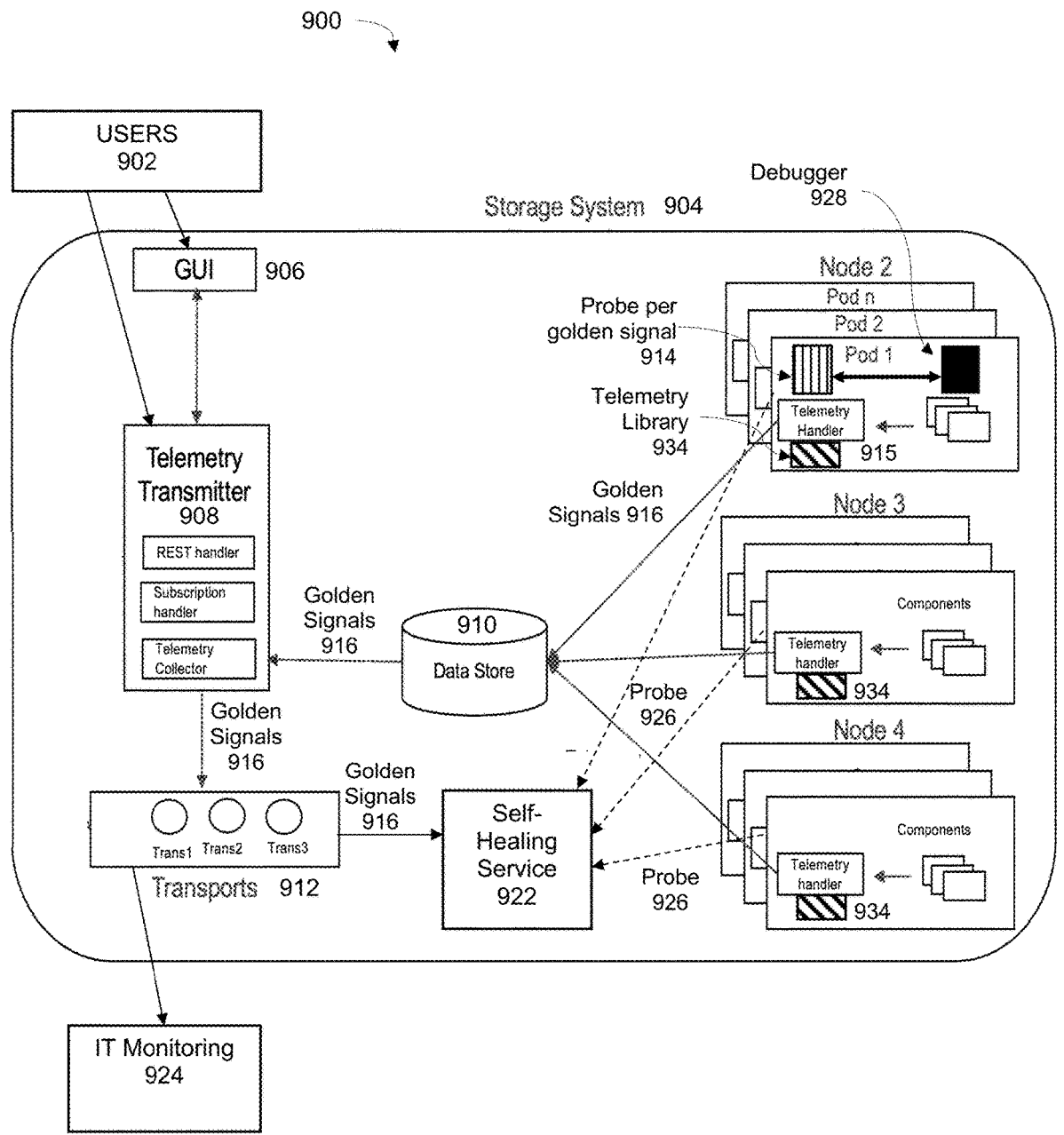
FIG. 9 illustrates a telemetry data processing system for golden signals, under some embodiments.

FIG. 9 illustrates a Kubernetes-based telemetry system processing golden signals, under some embodiments. As shown in FIG. 9, and similar to the system of FIG. 4, system 900 includes a containerized storage system 904 comprising a number of nodes (e.g., denoted Node 2, Node 3, Node 4, and so on), each having a number of pods (e.g., Pod 1 to n). Each pod has a telemetry handler component 916 that sends telemetry data 914 in the form of metrics to a data store 410.

In system 900, telemetry consumers are allowed to make dynamic subscriptions for receiving different metric datasets 914 through one or more different transport mechanisms 412 for which they have subscribed. Consumers can be GUIs 406, internal pods, storage vendor IT backend systems 924, or storage system users. Raw data from the pods is collected through their respective telemetry handlers 916 and stored in a central data store 410, such as through the OTEL interface. A telemetry transmitter 908 reads data from datastore, performs any required processing and then sends the telemetry data to the subscribers through the subscribed transports 912.

For the embodiment of FIG. 9, the pods send golden signal telemetry signals 916 to the datastore 910 for storage. These golden signals are then transmitted as appropriate through the system to users through transports 916. Subscribing users can receive golden signals per their subscription terms, as described above with respect to the process of FIG. 6. In this case, golden signals are simply treated as a class of telemetry data.

A Kubernetes system may use probes to verify certain states of the containers in the system. For example, a liveness probe can be used to indicate when to restart a container, a readiness probe may be used to know when a container is ready to start accepting traffic, a startup probe may be used to know when a container application has started, and so on. For the embodiment of FIG. 9, system 900 employs probes 926 to implements certain self-healing processes. For this embodiment, the system does not need to restart an entire pod in the event that any issue is detect in the REST API workflows involving multiple pods. With reference back to claim 1, a self-healing process 119 uses golden signals 117 to self-heal problematic issues inside a single pod as well as error situations involving a series of pods involved in a REST API workflow of the Santorini cluster 101.

For this embodiment, golden signals 916 are be dynamically collected for every pod and stored in the datastore 910. The telemetry collector in the telemetry transmitter 908 performs the golden signal collection process, as described in above embodiments. The golden signals are processed through a telemetry library 934 provided to each pod sending gold signals.

The probes 926 perform a system monitoring function to monitor the containers of the system, and can be configured to monitor the specific state of a pod, container, and/or individual applications housed in the containers.

The self-healing architecture of system 900 utilizes the golden signals in combination with a self-healer pod that monitors different golden signals in relation to defined thresholds, probes that can be called by self-healer pod upon crossing a threshold value, and an intelligent debugger inside the pod for addressing issues specific to the pod. As shown in FIG. 9, Pod 1 of Node 2 illustrates an example of a self-healing pod for Node 2. This pod includes a telemetry handler 915 comprising a REST handler, one or more probes per the golden signals 914, and an intelligent debugger 928. The other nodes (Node 3, Node 4) can also have similar self-healing pods, or they may utilize the self-healing pod for another node, such as Node 2.

In system 900, every pod registers its self-healing probe per golden signal with needed details like REST endpoints, threshold values, and so on.

In an embodiment, a self-healing service 922 is registered as a subscriber for golden signals 916 to the telemetry collector of transmitter 918. Whenever a self-healer pod determines that a threshold value for a golden signal is crossed for any registered pod, then respective probe will be called for self-healing through service 922.

For every pod an intelligent debugger 928 can be deployed that is designed to be triggered by the probes 926. This debugger can be configured to address different types of issues as detected in the pod, depending on applications, system configuration, and so on.

Each of the golden signals 800 can be used and probed to provide an indication of a particular problem. For example, one common reason causing latency for REST APIs is the time taken in reading/writing to a database. This could be because database is locked by some process and not released. With collection of the latency golden signal, the latency issue due to database locking can be identified and addressed through self-healing service 922 and debugger 928. Using the telemetry architecture with golden signal collection and self-healer pods, the latency issue for a pod workflow can be analyzed. If the issue is found to be due to database locking, the system could address by forcing a release of the database lock, offloading database processing to another node, or other remedial measures. In this way, database locking causing latency in any REST API workflow involving multiple pods can be dynamically detected and corrected using the self-healing architecture based on a latency golden signal. This is just one example of the use of a golden signal in used by Kubernetes probe features and a self-healing service. Many other examples are also possible using any of the other golden signals of traffic, errors, saturation, and so on.

Figure 10:
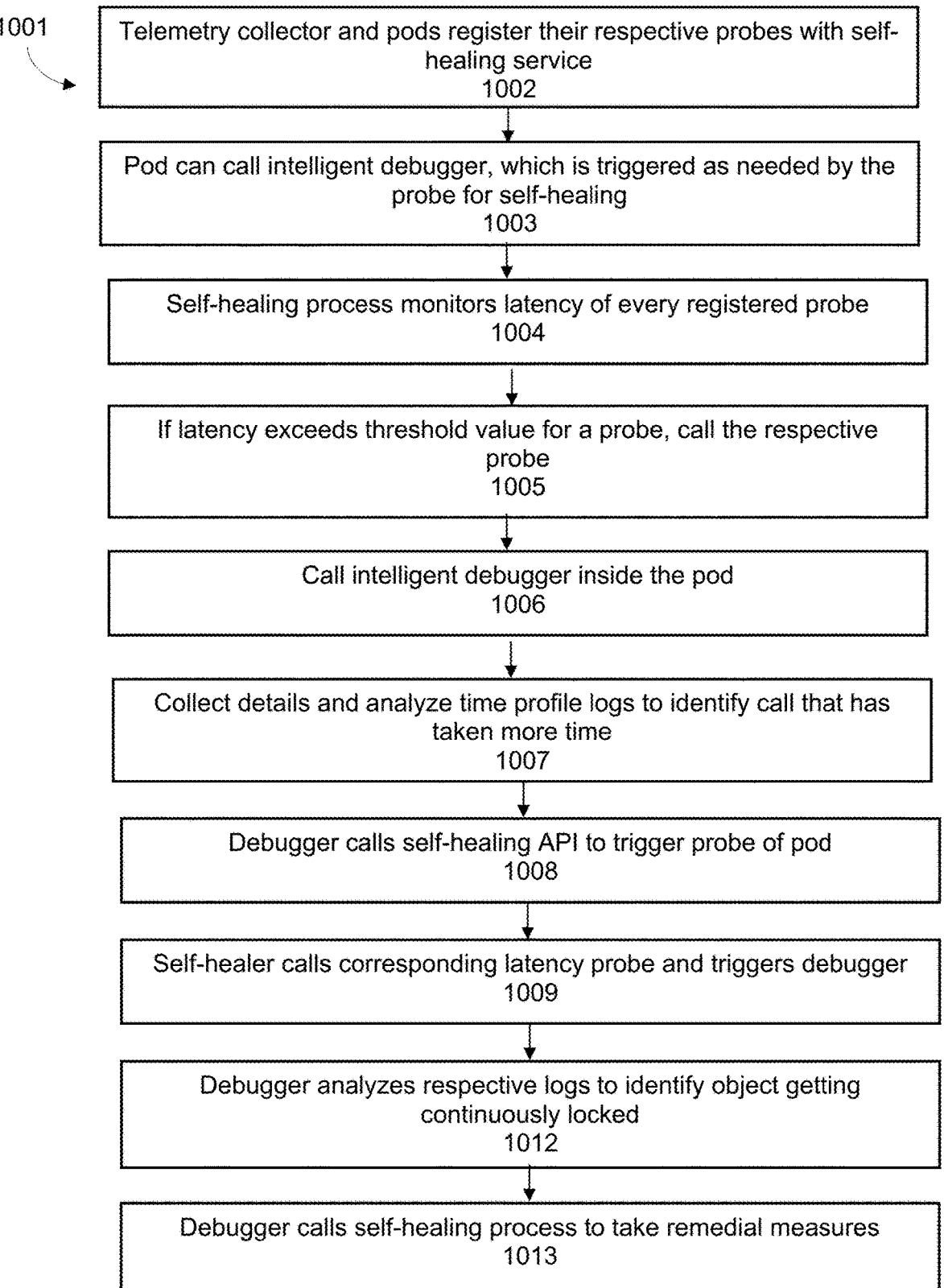
FIG. 10 is a flowchart illustrating a method of using golden signals for self-healing, under some embodiments.

FIG. 10 is a flowchart illustrating a method of using golden signals for self-healing, under some embodiments. Process 1001 starts with the telemetry collector and pods register their respective probes with the self-healing process, 1002. For latency monitoring, this involves registering the latency probe, and the same for the other golden signals. Every pod will have a process call to an intelligent debugger, which will be triggered as needed by the probe for self-healing different pod related issues, 1003.

While registering a probe, certain parameters are specified. FIG. 11 illustrates an example of registering a latency probe for a latency golden signal, under an example embodiment. Table 1100 specifies the name of the registering pod, such as telemetry transmitter and timescale pod, and the name of the latency probe for each pod. The parameters for these probes include the API endpoints, and the threshold value, as shown. It should be noted that FIG. 11 is provided for purposes of illustration and embodiments are not so limited. Any number of probes for any type of golden signal may be used, and the parameters and parameter values may be the same or different, as appropriate.

As shown in step 1004 of FIG. 10, the self-healing process monitors the latency for every registered probe. When it detects a latency beyond the threshold value for a probe, it will call the respective probe, 1005. For the example of FIG. 11, when the threshold for telemetry transmitter's metrics GET goes beyond 5 mins, the self-healer will call the . . . /telemetrytransmitter/goldensignals/latency probe.

The inside latency probe of the telemetry transmitter will then start an intelligent debugger process designed for debugging golden signal issues inside the pod, 1006. This debugger will collect details of the current threshold issue and start time profiling the REST endpoint by making a debugging call to the same REST endpoint with the same parameters. After getting response from the REST endpoint, the debugger will analyze time profile logs to find out which call has taken more time, 1007. The debugger will then call the self-healing process API to trigger a probe of the appropriate pod, 1008. For example, if the call to TimeScale database is showing more time, then it will call self-healer API to trigger a probe of TimeScale database pod.

Inside the pod identified in step 1008, the self-healer will call the corresponding latency probe, and the its intelligent debugger will be triggered to call the same API with same parameters with time profile, 1009. For the example above, the self-healer will call TimeScale database's latency probe, and inside the TimeScale database pod, the debugger will be triggered to call the same API with same parameters with time profile. The debugger will then analyze respective logs to find out database (or other data objects) that is getting continuously locked, 1012. The debugger can then call the self-healing process and report functionality, which can then take remedial measures 1013.

For an example of the TimeScale pod, the remedy can be to first use a fuser command to find out which process or processes locked the database. It can then take a backup of the database, and restart the processes locking the database. The REST API with the same parameters will then be called once again to ensure that the database is no longer locked. After this, the system vendor can be alerted and sent a message stating that the database is getting locked continuously by specific processes so that support and engineering can address any code issue in a fix or future upgrade.

Although embodiments are described and illustrated with respect to latency probes and excessive database operation latency, it should be noted that embodiments can include any probe, golden signal, and issue.

As shown in FIG. 10, a first step (step 1002) is to register probes for the golden signals with the self-healing service. In an embodiment, this registration involves validating a schema of the probes including the name and format of the probe as a data object.

In an embodiment, a catalog is used to store the list of schemas of available metrics to which consumers can subscribe. Every metric will be represented in the catalog using its schema. When new metrics get dynamically registered by any telemetry producer through a REST API, schema of these new metrics get updated to the catalog so that consumers get up-to-date catalog information for subscription.

Embodiments of the dynamic telemetry process 112 include a dynamic registration process 117 for new metrics including probes along with the golden signals themselves. This process includes a registration method for data producers to add new data sets dynamically to the telemetry workflow. This involves making dynamic changes to the data handling procedures at multiple points, including data generation, data collection, data storing, data sharing with subscribers, and so on.

In an embodiment, the telemetry producers are provided with a telemetry library that connects with a REST API in the telemetry transmitter to register new metrics. A registration API allows the producer to share a schema for the new data, which the registration API will then verify to determine whether or not the schema is approved to add a new dataset. Once the new metric is validated, it will be added to the telemetry catalog. At the same time, the REST handler will send an information alert to all the subscribers notifying them that a new metric dataset is available for subscription. Users can then access the catalog to discover the new metric schema and subscribe if needed.

When the data streams are first created for the newly registered dataset, a telemetry library can validate the generated data set against the registered schema in the catalog and then store it in the data store. The OTEL-based telemetry pipeline already has the capability to add new OTEL streams dynamically for the new dataset and time-series tables will be created for the new metric. The telemetry collector checks subscriptions and if any subscription for the new metric is found, it will collect and send new metric dataset along with the current metrics to subscribers.

FIG. 12 is a flowchart that illustrates a method of dynamically registering new telemetry datasets including golden signals and probes, under some embodiments. Process 1200 of FIG. 12 begins with step 1202 of generating a new telemetry dataset in a telemetry producer. A telemetry is provided to the producer to connect through the REST API in the telemetry transmitter to validate and register the new dataset, 1204. A schema validator in the telemetry transmitter checks the schema of the new metric and accept or rejects the new metric, 1206. If accepted, the schema of the new metric is stored in a telemetry catalog as a validated schema, 1208. The new metric dataset is then sent to the datastore from the producer as a validated new metric, 1210. The schema validator may have defined rules that check the schema against the defined format requirements, such as valid JSON format, nesting within a number (n) of fields not beyond a maximum, and so on.

Subscribers are notified as to the addition of the new schema and can elect to receive the new metric datasets. Any subscriber receiving the new metric will have their subscription terms updated to include the new metric.

The process 1100 is dynamic in that the new telemetry data can be generated and validated with the telemetry catalog updated as needed while the cluster network is running. In this manner, the catalog of metric telemetry data allowed for every newly generated metric can be constantly updated and used. Furthermore, subscribers are alerted in real-time as to the new metric and their subscriptions can be immediately updated to include these new metrics.

Figure 13:
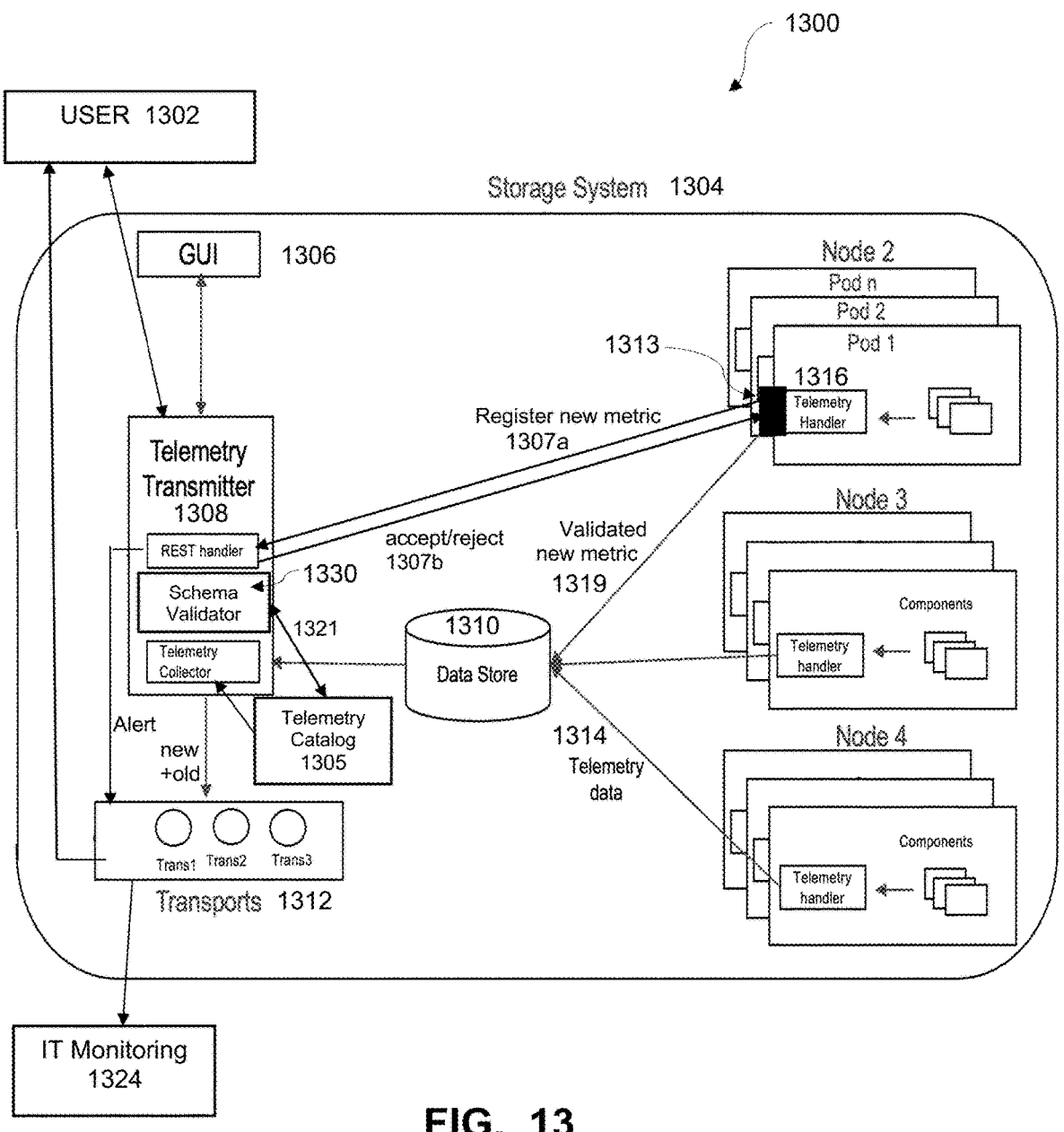
FIG. 13 illustrates a telemetry data processing system implementing dynamic registration of new metrics including golden signals and probes, under some embodiments.

FIG. 13 illustrates a telemetry data processing system implementing dynamic registration of new metrics including golden signals and probes, under some embodiments. System 1003 of FIG. 13 includes a containerized storage system 1304 comprising a number of nodes (e.g., denoted Node 2, Node 3, Node 4, and so on), each having a number of pods (e.g., Pod 1 to n). Each pod has a telemetry handler component 1316 that sends telemetry data 1314 in the form of metric datasets to a data store 1310. Telemetry consumers (users) make dynamic subscriptions (as described above) to receive metric datasets through one or more different transport mechanisms 1312. Raw data 1314 from the pods is collected through their respective telemetry handlers 1316 and stored in the central data store 1310. A telemetry transmitter 1308 reads data from data store, performs any required processing and then sends the telemetry data to the users 1302 or other entities, such as IT monitoring 1324 through the subscribed transports 1312.

As described above, the various consumers of telemetry data 1314 subscribe to receive desired metric datasets over appropriate transports 1312. A subscription table (such as illustrated in Table 1, above) can be set up and stored in the data store 1310.

In system 1003, one or more of the telemetry producers (e.g., pods and nodes) can add new telemetry metrics to be sent to the consumers (e.g., users, monitors). As shown for the example of FIG. 13, Pod 1 of Node 2 adds new metrics through a telemetry library 1313. This telemetry library allows the producer to share the schema of the new data so that it can be approved for use. Using appropriate APIs between the producer and telemetry transmitter, this new metric is registered 1307a through the REST handler of the telemetry transmitter 1308. A schema validator 1330 in the transmitter 1308 accepts or rejects the new metric 1307b. The schema validator checks the form of the new metric to make sure it conforms to defined schema for the metric datasets. When a new metric is validated by the schema validator, the schema stored through step 1321 in the telemetry catalog 1305. At this point, the new dataset from the telemetry producer library 1313 is sent by the telemetry handler 1316 is the producer to the datastore 1310 as a validated new metric 1319.

After acceptance of the new metric, the telemetry transmitter 1308, through the REST handler sends a notification alert to the subscribing users through the transports 1312 to notify them that a new metric dataset is available. If any subscriber elects to subscribe to the new metric, the transports 1312 will receive the current (old) datasets along with the new dataset 1319 from the datastore and telemetry transmitter for dissemination to the appropriate subscriber or subscribers.

As described above, in an embodiment, system 100 includes certain processes that may be implemented as a computer implemented software process, or as a hardware component, or both. As such, it may include executable modules executed by the one or more computers in the network, or embodied as a hardware component or circuit provided in the system. The network environment of FIG. 1 may comprise any number of individual client-server networks coupled over the Internet or similar large-scale network or portion thereof. Each node in the network(s) comprises a computing device capable of executing software code to perform the processing steps described herein.

Figure 14:
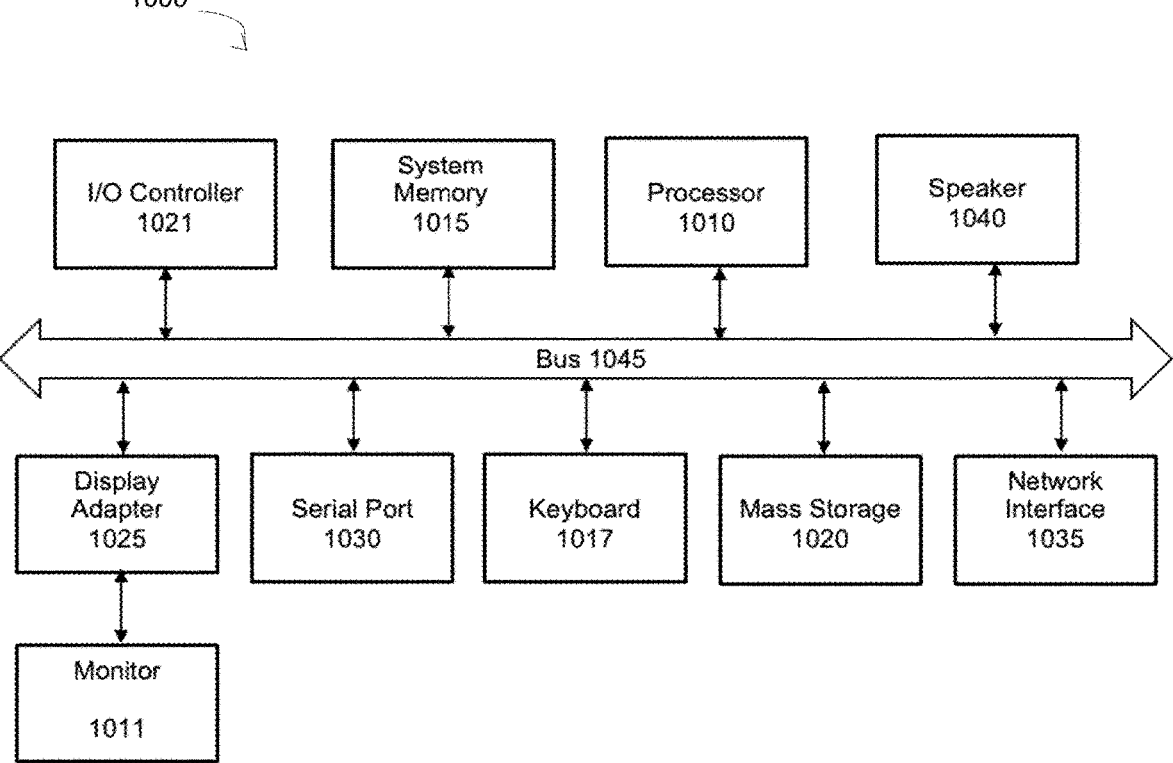
FIG. 14 is a block diagram of a computer system used to execute one or more software components of the processes described herein, under some embodiments.

FIG. 14 is a block diagram of a computer system used to execute one or more software components of the processes described herein, under some embodiments. The computer system 1000 includes a monitor 1011, keyboard 1017, and mass storage devices 1020. Computer system 1000 further includes subsystems such as central processor 1010, system memory 1015, input/output (I/O) controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1000. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1000 is an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules, or instantiated as distributed objects. The computer software products may also be component software. An operating system for the system may be one of the Microsoft Windows®. family of systems (e.g., Windows Server), Linux, Mac™ OS X, Unix, and so on.

Although certain embodiments have been described and illustrated with respect to certain example network topographies and node names and configurations, it should be understood that embodiments are not so limited, and any practical network topography is possible.

Embodiments may be applied to data, storage, industrial networks, and the like, in any scale of physical, virtual or hybrid physical/virtual network, such as a very large-scale wide area network (WAN), metropolitan area network (MAN), or cloud-based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network. The network may comprise any number of server and client computers and storage devices, along with virtual data centers (vCenters) including multiple virtual machines. The network provides connectivity to the various systems, components, and resources, and may be implemented using protocols such as Transmission Control Protocol (TCP) and/or Internet Protocol (IP), well known in the relevant arts. In a distributed network environment, the network may represent a cloud-based network environment in which applications, servers and data are maintained and provided through a centralized cloud-computing platform.

Some embodiments of the invention involve data processing, database management, and/or automated backup/recovery techniques using one or more applications in a distributed system, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Although embodiments are described and illustrated with respect to certain example implementations, platforms, and applications, it should be noted that embodiments are not so limited, and any appropriate network supporting or executing any application may utilize aspects of the backup management process described herein. Furthermore, network environment 100 may be of any practical scale depending on the number of devices, components, interfaces, etc. as represented by the server/clients and other elements of the network. For example, network environment 100 may include various different resources such as WAN/LAN networks and cloud networks 102 are coupled to other resources through a central network 110.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method of processing golden signal telemetry data in a Kubernetes-based cluster network having a plurality of nodes and pods, comprising: defining golden signals as comprising telemetry data related to traffic, latency, errors, and saturation in storage system of the network; tracking, in a telemetry handler of each pod, golden signal telemetry data for sharing in the network; storing, in a telemetry catalog, schema of the golden signal telemetry data generated as metric datasets by the pods in the network; transmitting, by a telemetry transmitter, the metric datasets to one or more data consumers of the network through a selected transport mechanism; and validating the schema of the golden signal telemetry data through a REST application programming interface (API) handler of the telemetry transmitter, and a telemetry library maintained in each pod, and implementing an optional sidecar mechanism to inject golden signal containers into pods so that golden signals are always sent as part of the telemetry data.

2. The method of claim 1 wherein the telemetry data comprises data generated periodically by each pod upon operation in the cluster network, and further wherein the one or more consumers comprises at least one of: pod components of the nodes, storage users, graphical user interfaces (GUI), and storage vendors.

3. The method of claim 1 wherein metric datasets of the golden signal telemetry data is formatted into a structured format for storage in a central datastore accessed by the telemetry transmitter, and wherein the validating step comprises comparing a format of the golden signal metric datasets received by the pods against a defined structured format.

4. The method of claim 3 wherein the consumers are validated as subscribed to receive golden signal telemetry data through a subscription process comprising: implementing the selected transport mechanism through the use of the REST API; providing the REST API for each transport mechanism to enable subscription by a consumer to become a subscribed consumer; and storing subscription details of the subscribed consumers in a consumer subscription table.

5. The method of claim 3 wherein the cluster network comprises a Santorini network processing containerized data utilizing Kubernetes containerization mechanisms, and wherein the pods perform network functions and generate the golden signal telemetry data for transmission to the consumers while performing data protection operations of a backup server.

6. The method of claim 5 further comprising inputting the telemetry data to the datastore through a telemetry pipeline, and wherein the telemetry pipeline implements an OpenTelemetry (OTEL) protocol, and comprises a collector receiving the telemetry data through a remote procedure call (RPC) process.

7. The method of claim 5 wherein the data protection operations comprise at least one of a data backup, data restore, or data migration operation initiated by a deduplication backup program executed by the backup server.

8. The method of claim 7 wherein the latency golden signal measures a time between a moment a data protection operation is requested and when it is initiated, the traffic golden signal measures an amount of activity present in an initiated operation, the errors golden signal measures a rate at which requests to the backup server are failing, and the saturation golden signal measures system utilization in terms of how much excess capacity the initiated operation has available.

9. The method of claim 8 wherein the structured format of the golden signal telemetry data includes a threshold value defined for each golden signal, the method further comprising: checking an operational parameter for each golden signal; and indicating when the operational parameter exceeds a corresponding threshold value to notify the cluster network of a problem in a respective pod.

10. The method of claim 9 wherein the tracking, storing, and validating steps are performed while the cluster network is performing a data protection operation so that goldensignal metric datasets can be processed dynamically in a running cluster network, a pod does not need to be restarted to detect the problem.

11. A method of processing golden signal telemetry data in a cluster network executing a backup operation processing data from a plurality of pods each periodically generating golden signal metric datasets for transmission to consumers, comprising: receiving a selection of golden signal metric datasets from a consumer with a specified transport mechanism; subscribing the consumer in the network to receive the metric datasets through validation of a schema conforming to a structured format defined by a telemetry transmitter; validating a schema of each golden signal metric dataset based on the structured format through a REST application programming interface (API) handler of the telemetry transmitter, and a telemetry library maintained in each pod, and implementing an optional sidecar mechanism to inject golden signal containers into pods so that golden signals are always sent as part of the telemetry data; and transmitting validated golden signal metric datasets to all subscribed consumers in accordance with respective subscription terms.

12. The method of claim 11 wherein the telemetry data is related to traffic, latency, errors, and saturation in storage system of the network during execution of the backup operation that is used to reveal problems encountered by the pods.

13. The method of claim 12 wherein the latency golden signal measures a time between a moment a data protection operation is requested and when it is initiated, the traffic golden signal measures an amount of activity present in an initiated operation, the errors golden signal measures a rate at which requests to the backup server are failing, and the saturation golden signal measures system utilization in terms of how much excess capacity the initiated operation has available.

14. The method of claim 13 further comprising associating a respective threshold value with each golden signal metric dataset, and wherein an operating condition in excess of a threshold value indicates a problem associated with a respective aspect measured by a golden signal.

15. The method of claim 14 wherein the validating step is performed while the cluster network is performing a data protection operation so that golden signal metric datasets can be processed dynamically in a running cluster network, a pod does not need to be restarted to detect any of the problems.

16. The method of claim 14 wherein the telemetry data comprises data generated periodically by each producer upon operation in the cluster network, and further wherein the one or more consumers comprises at least one of: pod components of the nodes, storage users, graphical user interfaces (GUI), and storage vendors.

17. The method of claim 16 wherein metric datasets of the golden signal telemetry data is formatted into a structured format for storage in a central datastore accessed by the telemetry transmitter, and wherein the validating step comprises comparing a format of the golden signal metric datasets received by the pods against the structured format.

18. A system for processing golden signal telemetry data in a cluster network executing a backup operation processing data from a plurality of pods each periodically generating golden signal metric datasets for transmission to consumers, comprising: a telemetry pipeline receiving a selection of golden signal metric datasets from a consumer with a specified transport mechanism; a telemetry transmitter subscribing the consumer in the network to receive the metric datasets through validation of a schema conforming to a structured format defined by a telemetry transmitter, and validating a schema of each golden signal metric dataset based on the structured format; a transport mechanism transmitting validated golden signal metric datasets to all subscribed consumers in accordance with respective subscription terms; and a validator validating the schema of the golden signal telemetry data through a REST application programming interface (API) handler of the telemetry transmitter, and a telemetry library maintained in each pod, and implementing an optional sidecar mechanism to inject golden signal containers into pods so that golden signals are always sent as part of the telemetry data.

19. The system of claim 18 wherein the telemetry data is related to traffic, latency, errors, and saturation in storage system of the network during execution of the backup operation that is used to reveal problems encountered by the pods, and wherein the latency golden signal measures a time between a moment a data protection operation is requested and when it is initiated, the traffic golden signal measures an amount of activity present in an initiated operation, the errors golden signal measures a rate at which requests to the backup server are failing, and the saturation golden signal measures system utilization in terms of how much excess capacity the initiated operation has available, and further wherein a respective threshold value is associated with each golden signal metric dataset, and wherein an operating condition in excess of a threshold value indicates a problem associated with a respective aspect measured by a golden signal.

20. The method of claim 18 wherein the ARL lock period locks the file from modification, revision, deletion, or renaming, and yet further wherein files within the flagged sub-directory and its sub-directory hierarchy are allowed to be to be manually retention locked.

\* \* \* \* \*